(12) United States Patent
Benedict

(10) Patent No.: US 6,418,174 B1
(45) Date of Patent: Jul. 9, 2002

(54) FREQUENCY SHIFT KEY MODULATOR

(75) Inventor: Mike Benedict, Jamestown, NC (US)

(73) Assignee: RF Micro Devices, Inc., Greensboro, NC (US)

( * ) Notice: Subject to any disclaimer, the term of this patent is extended or adjusted under 35 U.S.C. 154(b) by 0 days.

(21) Appl. No.: 09/253,625

(22) Filed: Feb. 19, 1999

(51) Int. Cl.$^7$ .......................... H03L 7/08; H03K 21/00
(52) U.S. Cl. ...................... 375/303; 375/376
(58) Field of Search ................... 375/303, 326, 375/376, 375; 370/128; 332/127, 128; 331/25

(56) References Cited

U.S. PATENT DOCUMENTS

| | | | | |
|---|---|---|---|---|
| 4,567,603 A | * | 1/1986 | Howell et al. | 375/65 |
| 5,020,079 A | | 5/1991 | Vancraeynest | 375/64 |
| 5,066,927 A | * | 11/1991 | Dent | 331/1 A |
| 5,095,288 A | * | 3/1992 | Dent | 331/17 |
| 5,180,933 A | * | 1/1993 | Krzyzanowski | 307/514 |
| 5,323,125 A | | 6/1994 | Hiben et al. | 332/100 |
| 5,329,258 A | | 7/1994 | Matsuura | 332/100 |
| 5,382,924 A | | 1/1995 | Pardoen et al. | 332/100 |
| 5,434,888 A | | 7/1995 | Fukuchi | 375/307 |
| 5,835,539 A | * | 11/1998 | Yamakado | 375/303 |
| 5,983,077 A | * | 11/1999 | Dent | 455/44 |
| 6,044,124 A | * | 3/2000 | Monahan et al. | 375/376 |
| 6,064,272 A | * | 5/2000 | Rhee | 331/16 |
| 6,157,271 A | * | 12/2000 | Black et al. | 332/127 |
| 6,172,579 B1 | * | 1/2001 | Dacus et al. | 332/128 |
| 6,236,275 B1 | * | 5/2001 | Dent | 331/1 A |

OTHER PUBLICATIONS

Sheikh et al., "CMOS Low–Power Microwave Frequency Prescaler for Wireless Applications", IEEE 1997, Engineering Innovation: Voyage of Discovery, IEEE 1997 Canadian Conference, vol. 2, pp. 637–640.*

Craninckx et al., "A Fully Integrated CMOS DCS–1800 Frequency Synthesizer", IEEE Journal of Solid–State Circuits, vol. 33, No. 12, pp. 2054–2065, Dec. 1998.*

Trost et al., "A 3.8–mW 2.5–GHz Dual–Modulus Prescaler in a 0.8 μm Silicon Bipolar Production Technology", IEEE 1998 International Symposium on Lower Power Electronics and Designs, pp. 20–23, 1998.*

Craninckx et al., "A 1.75–GHz/3–V Dual–Modulus Divide–by–128/129 Prescaler in 0.7– μm CMOS", 1996 IEEE Journal of Solid–State Circuits, vol. 31, No. 7, pp. 890–897, Jul. 1996.*

"Delta–Sigma Modulation in Fractional–N Frequency Synthesis," Riley, Copeland, Kwasniewski, IEEE Journal of Solid–State Circuits, vol. 28, No. 5, May 1993.

"A 27–mW CMOS Fractional–N Synthesizer Using Digital Compensation for 2.5–Mb/s GFSK Modulation," Perrott, Tewksbury, Sodini, IEEE Journal Of Solid–State Circuits, vol. 32, No. 12, Dec. 1997.

"An Agile ISM Band Frequency Synthesizer with Built–In GMSK Data Modulation," Filiol, Riley, Plett, Copeland, IEEE Journal of Solid–State Circuits, vol. 33, No. 7, Jul. 1998.

* cited by examiner

Primary Examiner—Chi Pham
Assistant Examiner—Dung X. Nguyen
(74) Attorney, Agent, or Firm—Withrow & Terranova, P.L.L.C.

(57) ABSTRACT

The present invention provides an FSK modulation circuit and technique that controls a prescaler to generate an FSK output. In particular, a VCO output is sent to a prescaler controlled by a modulus control signal. The modulus control signal contains a series of pulses having a first duty cycle to effect a mark frequency and a second duty cycle to effect a space frequency. During a given cycle, the prescaler divides the VCO output frequency by two different divisors. The resulting frequency is compared with a reference frequency using a phase detector. Changing the duty cycle of the modulus control signal controlling the prescaler causes the VCO to provide a corresponding, synthesized frequency from the VCO for FSK modulation.

19 Claims, 3 Drawing Sheets

FREQUENCY SHIFT KEY MODULATOR

BACKGROUND OF THE INVENTION

The present invention relates to modulation techniques, and, in particular, to an innovative and economical frequency shift key (FSK) modulation technique. A typical, low-cost FSK modulator is implemented by injecting a modulation voltage into a phase lock loop (PLL) of a carrier synthesizer. This is generally done in two ways. The first way is summing the modulation voltage and the loop error voltage together and applying that to a voltage controlled oscillator's (VCO) tuning port. The second way is using a separate tuning port having lower sensitivity to voltage changes. The modulating data changes the carrier frequency by a predetermined amount. Such deviation of the carrier frequency causes error within the PLL which the PLL attempts to correct. The effect of the PLL correcting frequency errors caused by modulation is analogous to passing the modulation signal through a high-pass filter in which lower frequency components of the modulation signal are filtered out or eliminated. The result is unreliable communications for random data streams, especially for long strings of unchanged bits, which appear to have significant DC components.

There are several techniques that address this problem. One approach is to predistort the modulation signal to compensate for the effects of the PLL. Predistorting the modulation signal limits the frequency range of the modulator. Another commonly used method is to encode a data stream using techniques such as Manchester coding or split-phase coding. The basis of coding is to send two complementary symbols for every data bit; thus, a transition is guaranteed for every data bit. Such encoding techniques are rather simple. Typically, the data and a clock are exclusive-ORed together. Coding is very effective in that it configures the lowest frequency component of the modulation signal so that the PLL bandwidth has minimal effect on the coded data. Unfortunately, this effectively doubles the transmission data rate, which significantly increases channel bandwidth. Additionally, decoding the transmitted data is complicated.

Other FSK modulation approaches avoid these problems altogether by modulating outside of the PLL loop. For Example, FSK modulation is made possible by modulating the reference crystal. In a typical embodiment, a varactor is used to pull the center frequency of a crystal to the mark and space frequencies. Since the modulation occurs outside the loop, the PLL does not effect the modulation signal, it simply tracks the changes in the reference frequency. The pullability of the crystal limits frequency deviation and thus the maximum data rate. Given the variances in crystals and varactors, tuning is required to set the desired deviation. Yet another technique generates the reference frequency with a Direct Digital Synthesizer and modulates within the synthesizer. This technique is accurate and works very well, but is not economical. Thus, there is a need for an economical FSK modulation technique overcoming the deficiencies of the prior art.

SUMMARY OF THE INVENTION

The present invention provides an FSK modulation circuit and technique that controls a prescaler to generate an FSK output. In particular, a VCO output is sent to a prescaler controlled by a modulus control signal. The modulus control signal contains a series of pulses having a first duty cycle to effect a mark frequency and a second duty cycle to effect a space frequency. During a given cycle, the prescaler divides the VCO output frequency by two different divisors. The resulting frequency is compared with a reference frequency using a phase detector. Changing the duty cycle of the modulus control signal controlling the prescaler causes the VCO to provide a corresponding, synthesized frequency from the VCO for FSK modulation.

These and other aspects of the present invention will become apparent to those skilled in the art after reading the following description of the preferred embodiments when considered with the drawings.

DETAILED DESCRIPTION OF THE PREFERRED EMBODIMENTS

Figure 1:
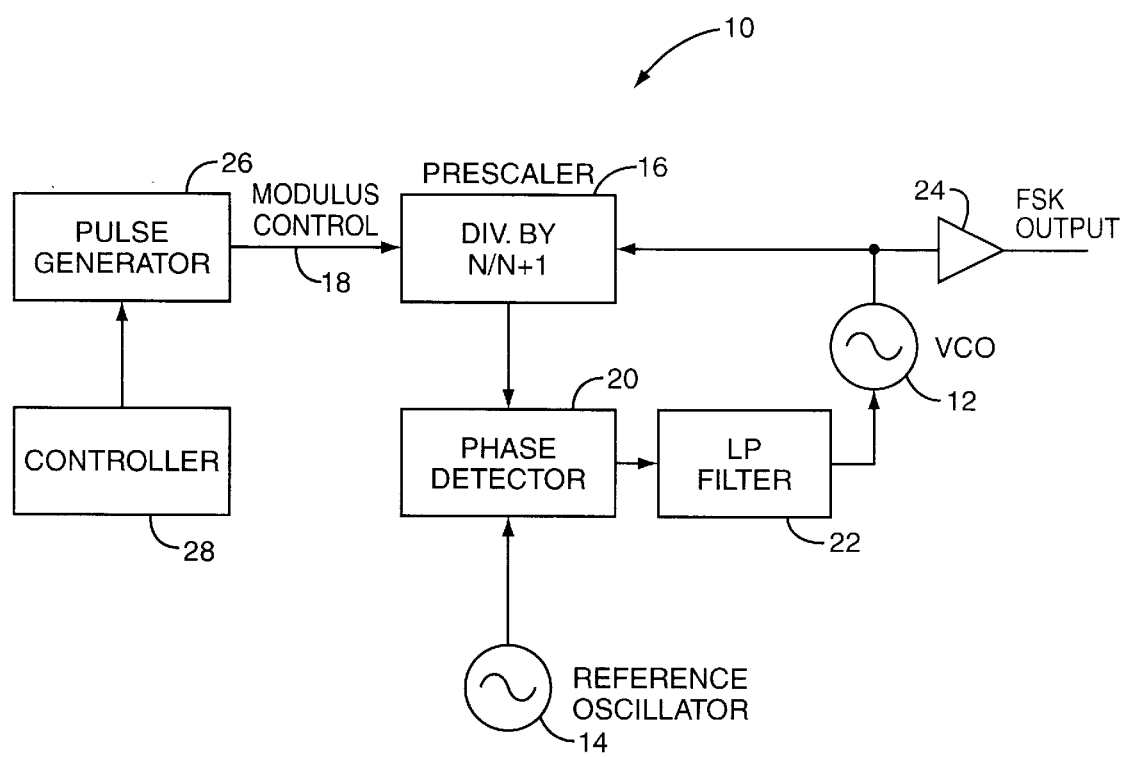
FIG. 1 is a block schematic of the present invention.

In the following description, like reference characters designate like or corresponding parts throughout the several views. Referring now to the drawings in general, and FIG. 1 in particular, understand that the illustrations are for the purpose of describing preferred embodiments of the invention and are not intended to limit the invention thereto.

In essence, the present invention programs mark and space frequencies within a phase locked-loop by integrating phase locked loop and voltage controlled oscillator functions. As those skilled in the art will recognize, mark and space frequencies represent the frequencies corresponding to binary logics state. When a first logic value is transmitted, an output of an FSK modulation circuit is a first frequency, and when a second logic value is transmitted, the output is a second frequency.

As shown in FIG. 1, an FSK transmitter 10 is shown including a voltage controlled oscillator (VCO) 12 providing a radio frequency output based on an input control signal. A reference oscillator 14 is provided to supply a reference radio frequency. The output of the VCO 12 is received by prescaler 16, which operates to divide the VCO output frequency by an integer n or n+1 depending upon a modulus control signal 18. The integers n and n+1 are preferably set to divide the VCO output frequency down to a frequency approximately equal to the reference frequency. Since the prescaler typically has two divisors, n and n+1, it is generally referred to as a dual modulus prescaler.

The output of the prescaler 16 and the output of the reference oscillator 14 are sent to a phase detector 20. The phase detector 20 compares the differences between the two signals and provides a control signal for the VCO 12. Typically the phase detector 20 will provide a pulsed output representative of the difference in frequency or phase of the outputs of the prescaler 16 and reference oscillator 14 (i.e., the reference frequency). These pulses are often passed through smoothing circuitry, such as a low-pass filter 22, to provide a control voltage for the voltage controlled oscillator 12, The VCO output is also the FSK modulated signal, which is amplified and transmitted using transmission amplifiers and buffers 24. In operation, the modulus control signal 18 is configured as a pulse stream having a first duty cycle representing a first logic value and a second duty cycle representing a second logic value for transmission. Depending on the logic value and the corresponding duty cycle of the modulus control signal 18, the modulus control signal 18 changes and, thus, causes the prescaler 16 to divide the VCO output frequency by n and n+1 at different times for each given logic value. There are numerous ways to generate a modulus control signal 18. In general, a pulse generator 26 is used to generate a pulse stream having two possible duty cycles corresponding to the logic states for transmission. The pulse generator 26 is controlled by a controller 28 or other type of control system.

Since the modulus control signal 18 causes the prescaler 16 to divide the VCO output frequency by n and n+1 one or more times for any given logic state, the effective duty cycle of the modulus control signal 18 sets the FSK output frequency for the corresponding logic value. The modulus control signal for any given logic value may include a single pulse cycle or a series of pulses wherein the modulated output is changed when the duty cycle for the modulus control signal 18 changes.

The pulse generator 28 may provide a pulse width modulated output wherein the prescaler divides by n for part of a cycle and then divides by n+1 for the remainder of the cycle. Another way to generate the modulus control signal is to provide a clock pattern and periodically inject an extra bit in the pulse stream corresponding to a logic state to be transmitted. By changing the period of the injected bit, a new duty cycle is effected, and a new synthesized frequency is provided by the VCO 12. The step size between any two modulated output frequencies is set by the difference in duty cycles corresponding to the logic values for transmission in the modulus control signal 18.

Figure 2:
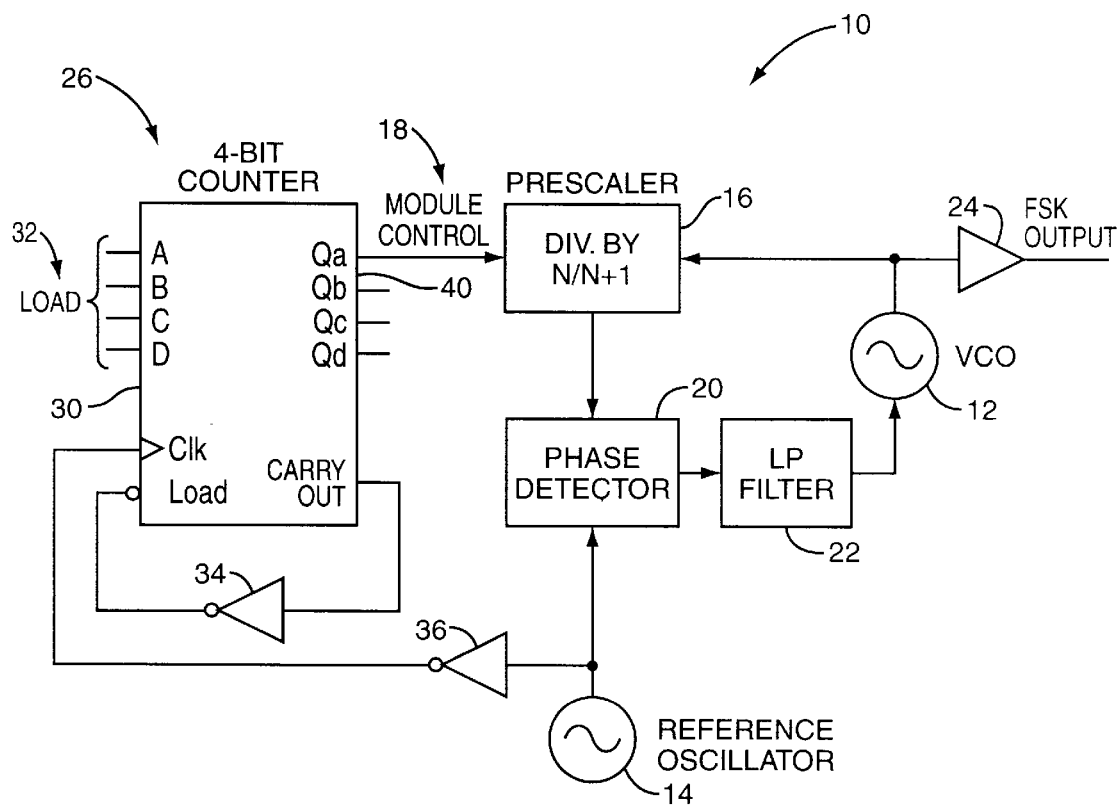
FIG. 2 is a block schematic of a preferred embodiment of the present invention.

The embodiment of FIG. 2 is similar to that of FIG. 1, with the exception that the pulse generator 26 takes the form of a 4-bit counter 30 having an input 32 for setting the counter 30. A carry-out output is tied back to a load input of the counter through an inverter 34. A clock input receives the reference frequency from the reference oscillator 14 through an inverter 36. The counter's output 40 (Qa) provides the modulus control signal 18. The counter 30 described herein starts counting to a value $2^b$ from the loaded value when the load input is triggered where b is the number of input bits for the counter. Since the counter starts counting from the loaded value s to $2^b$, the resulting cycle length is $2^b$-S states. Each state is one reference frequency cycle. Each cycle begins after the carry-out output triggers the load input. The carry-out output is triggered when the counter finishes counting from the loaded value s to $2^b$.

Figure 3:
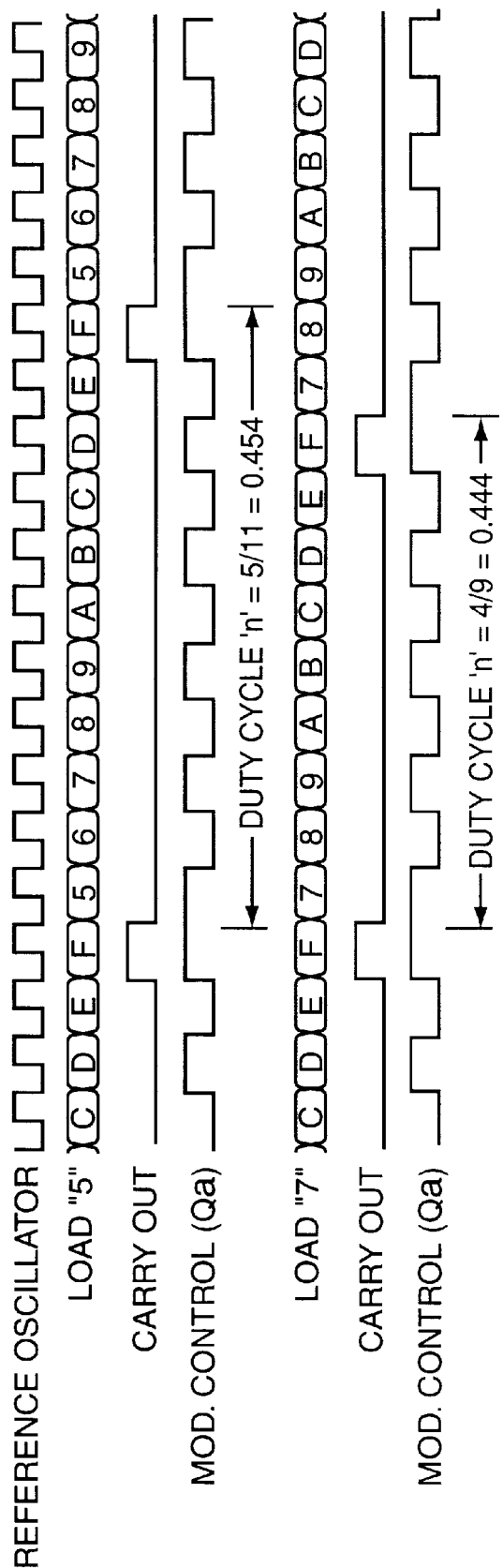
FIG. 3 is a timing diagram for the embodiment shown in FIG. 2.

As shown in the timing diagram of FIG. 3, the counter output, Qa, normally looks like the reference (clock) frequency divided by two. Preferably, the programmed value s appearing at the counter input 32 for loading is an odd number, such that a logic 1 is always loaded onto the 'A' bit of input 32. This assumes that the 'A' input is the least significant bit of the counter input 32. Maintaining a logic 1 on the 'A' bit of the load input 32 assures that each cycle will begin and end with a logic 1. Thus, output Qa is a logic 1 for the state at the end of each cycle and remains a logic 1 for the first state of the next cycle. Maintaining a logic 1 at the beginning and end of each cycle also assures that there is one more logic 1 than the logic 0 for every cycle in the modulus control signal 18. Providing an unequal number of 1's and 0's in any given cycle assures different duty cycles corresponding to different load values. Different duty cycles result in different synthesized frequencies at the VCO 12 output.

As an example, if b is the number of bits in the counter and s is the load value placed on the counter input 32, the modulus control signal 18 has the following characteristics once the load value s is loaded into the counter 30:

$$\# \text{ of 0's per cycle} = \frac{2^b - s - 1}{2}$$

$$\text{Duty cycle} = \frac{2^b - s - 1}{2(2^b - s)}$$

As noted above, the counter 30 is used to control the divide ratio of the prescaler 16. The Qa output toggles high and low except when the carry-out is asserted, which represents the end of one cycle and the beginning of another cycle. For a load value of '5,' the modulus control signal provided by the Qa output has 11 states (16−5) and is low for 5[(16−5−1)/2] out of the 11 states of the counter. The resulting duty cycle equals 0.454 or (16−5−1)/(2 (16−5)). The 'B' bit of the counter input 32 can be changed from a logic 0 to a logic 1 to change the load value from 5 to 7 at the counter's input. For a load value of 7, the modulus control signal provided by the Qa output has 9 states (16−7) and is low for 4 out of the 9 states, ((16−7−1)/2) for a duty cycle of 0.444 or (16−7−1)/(2 (16−7)).

If a reference frequency is set at 7.15909 Megahertz (MHz) and the prescaler 16 sets n=128 and n+1=129, the divide ratios are 128.454 and 128.444. Given these ratios, the output of the prescaler 16 is 919.6137 MHz for a logic "0" data input and 919.5421 MHz for a logic "1" data input. In this configuration, peak-to-peak frequency deviation of the FSK output is fixed at 71.6 kHz. Since the deviation is derived by numerical means as a fraction of the reference oscillator frequency, the modulation frequencies are very accurate and repeatable without tuning. The fixed deviation allows for a wide range of data rates, from 1 bit per second to 100 kilobits per second by using different modulation indices. The upper limit is actually limited by the loop bandwidth of the PLL, up to the point where the modulation index becomes too small. The invention provides accuracy down to DC.

The synthesized frequency is calculated as F(ref)*(N+n). If s and n(s) represent the space frequency, and m and n(m) represent the mark frequency, then the peak-to-peak frequency deviation is represented as F(ref)*(n(s)−n(m)). The present invention produces smaller deviations in the modulated frequencies with fewer dividers than previous techniques. During operation, the modulated data is used to set or clear the counter every cycle. An infinite number of cycles can occur at either the mark or space frequencies without correction by the phase lock loop, therefore, making the modulator accurate down to DC.

A family of transmitter or transceiver integrated circuits from RF Micro Devices of Greensboro, N.C., offer the internal PLL and dual modulus prescaler, which can be used to implement the preferred embodiment. The RF 2513 is a simple, low-cost transmitter for USA ISM band applications. The RF 2513 contains all of the active circuitry necessary to implement a single FSK modulator by including a transmitter, reference crystal oscillator, PLL, dual modulus prescaler, VCO, transmit buffer amplifier, and power amplifier. The RF 2513 also has an internal varactor for tuning the VCO. By using printed inductors for resonators, the external component count can be minimized. A 74HC161 4-bit counter is used to implement the counter, and a 74HC04 is used for the inverters 34 and 36, which act to load the counter and to buffer the reference oscillator that is used for the counter's clock. Data sheets for the above devices are incorporated herein by reference.

The phase lock loop bandwidth is designed to be reasonably wide and yet provide reasonable rejection to noise spurs. The loop bandwidth is one factor that determines the rate at which the VCO changes from one frequency to the other. As data rates exceed the loop bandwidth, the circuit becomes band-limited and suffers from inter-symbol interference. The present modulation technique is substantially immune to these effects.

A variety of applications can benefit using the present invention, including computer peripherals and remote controls, especially those which tend to send data in bursts with indeterminate pauses between transmissions.

Certain modifications and improvements will occur to those skilled in the art upon reading the foregoing description. It should be understood that all such modifications and improvements have been omitted for the sake of conciseness and readability, but are properly within the scope of the following claims.

What is claimed is:

1. A frequency shift keying modulation circuit comprising:
   a. a controllable oscillator adapted to provide an output radio frequency (RF) signal corresponding to an oscillator control signal;
   b. pulse generation circuitry adapted to provide a modulus control pulse stream having a first duty cycle over a first period when an input receives a first logic state and a second duty cycle over a second period when the input receives a second logic state, the first period being different than the second period and each logic state representing a bit of data to be transmitted;
   c. a dual modulus prescaler adapted to:
      i. receive the output RE signal and the modulus control pulse stream, and
      ii. scale the output RF signal by a first factor when the modulus control pulse stream has the fast duty cycle and by a second factor when the modulus control pulse stream has the second duty cycle to provide a scaled RF output signal; and
   d. a phase detector adapted to:
      i receive the scaled RF output signal and a reference RF signal, and
      ii. provide the oscillator control signal to control said controllable oscillator;
   e. wherein the output RF signal is a first frequency when the modulus control pulse stream has the first duty cycle and a second frequency when the modulus control pulse stream has the second duty cycle to provide a frequency shift keyed output corresponding to the duty cycles of the modulus control pulse stream.

2. The circuit of claim 1 wherein the controllable oscillator is a voltage controlled oscillator and said phase detector is adapted to provide a pulsed oscillator control signal based the difference in frequency between the scaled RF output signal and the reference RF signal.

3. The circuit of claim 2 wherein voltage controlled oscillator is associated with smoothing circuitry to condition the pulsed output into a voltage to control said voltage controlled oscillator.

4. The circuit of claim 3 wherein said smoothing circuitry is a low pass filter adapted to convert pulses from said phase detector into a corresponding voltage.

5. The circuit of claim 1 wherein said dual modulus prescaler is further adapted to divide the output RF signal by the first and second factor.

6. The circuit of claim 5 wherein division of the output RF signal by the first factor or the second factors result frequencies approximate to the reference frequency.

7. The circuit of claim 5 wherein the first factor N and the second factor is N+1.

8. The circuit of claim 1 wherein said pulse generation circuitry is configured to provide a pulse stream and periodically inject a bit to change a duty cycle of the modulus control signal from the first duty cycle to the second duty cycle when the pulse generation circuitry input receives tie second logic state.

9. The circuit of claim 1 wherein said pulse generation circuitry is configured to provide pulse width modulated output wherein output pulses are modulated to provide the first and second duty cycles corresponding to the input receiving the first and second logic states.

10. The circuit of claim 1 wherein said pulse generation circuitry comprises a counter having a input for receiving the first and second logic states for transmission and is adapted to provide the modulus control pulse stream having the first duty cycle when the first logic state is at the input and the second duty cycle when the second logic state is at the input, the first and second logic states being represented with first and second integer values to load said counter, said counter providing a pulse steam having a number of pulses forming a period corresponding to the integer values wherein when said counter is loaded with a first value the modulus control signal has the first duty cycle and when said counter is loaded with a second value the modulus control signal has the second duty cycle.

11. The circuit of claim 10 wherein said counter is clocked by the reference frequency and is configured to load a new input value when a carry output is internally triggered.

12. A frequency shift key (FSK) modulation circuit comprising:
   a. voltage controlled oscillator providing a synthesized frequency;
   b. pulse generation circuitry adapted to generate a modulus control signal providing a first pulse cycle having a first duty cycle over a first period corresponding to a mark and a second pulse cycle having a second duty cycle over a second period corresponding to a space, the first period being different from the second period;
   c. a dual modulus prescaler adapted to:
      i. receive the modulus control signal at a control input,
      ii. receive the synthesized frequency, and
      iii. provide a scaled frequency corresponding to the synthesized frequency divided by a first value when a first logic state is received at a control input and a second value when a second logic state is received at We control input; and
   d. a phase detector adapted to receive the scaled frequency and a reference frequency and provide a frequency control signal to said voltage controlled oscillator wherein the synthesized frequency directly corresponds to the first or second duty cycle for the modulus control signal.

13. The circuit of claim 12 wherein the first and second pulse cycles include a plurality of first logic states.

14. The circuit of claim 12 wherein the first and second pulse cycles begin and end with a first logic state.

15. The circuit of claim 12 wherein the first pulse cycle has a different number of states than the second pulse cycle.

16. The circuit of claim 12 wherein the first and second pulse cycles are pulse width modulated whereby the first pulse cycle and second pulse cycle include logic states of varying duration.

17. The circuit of claim 12 wherein the first and second pulse cycles:

a. include a plurality of first logic states, b. begin and end with a first logic state, and c. have a different number of states per cycle.

18. A frequency shift key (FSK) modulation circuit comprising:

a. controllable oscillator providing a synthesized frequency;

b. pulse generation circuitry adapted to generate a modulus control signal providing a first pulse cycle having a first duty cycle over a first period corresponding to a mark and a second pulse cycle having a second duty cycle over a second period corresponding to a space, die first period being different from the second period;

c. a means for scaling the synthesized frequency adapted to:

i. receive tie modulus control signal at a control input, ii. receive the synthesized frequency, and iii. provide a scaled frequency corresponding to the synthesized frequency scaled by a first value when a first logic state is received at a control input and a second value when a second logic state is received at the control input; and d. frequency comparison means adapted to receive the scaled frequency and a reference frequency and provide a frequency control signal to said controllable oscillation means wherein the synthesized frequency directly corresponds to the fist duty cycle or the second duty cycle for the modulus control signal.

19. A frequency shift key (FSK) modulation method comprising the steps of:

a. providing a synthesized frequency;

b. providing a modulus control signal having a first pulse cycle having a first duty cycle over a first period corresponding to a mark and a second pulse cycle having a second duty cycle over a second period corresponding to a space, the first period being different from the second period;

c. scaling the synthesized frequency based on the modulus control signal to provide a scaled frequency corresponding to the synthesized frequency scaled by a first value when the modulus control signal is a first logic state and a second value when the modulus control signal is a second logic state;

d. Comparing the scaled frequency and a reference frequency; and e. controlling the synthesized frequency based on the first duty cycle or the second duty cycle for the modulus control signal.

* * * * *

UNITED STATES PATENT AND TRADEMARK OFFICE
CERTIFICATE OF CORRECTION

PATENT NO. : 6,418,174 B1  Page 1 of 1
DATED : July 9, 2002
INVENTOR(S) : Mike Benedict It is certified that error appears in the above-identified patent and that said Letters Patent is hereby corrected as shown below:

Column 5,
Line 32, substitute -- RF -- for "RE".
Line 53, insert -- on -- after "based".
Line 55, insert -- the -- after "wherein".
Line 64, substitute -- factors -- for "factor".
Line 66, substitute -- factor results in -- for "factors result".

Column 6,
Line 1, insert -- is -- after "first factor".
Line 7, substitute -- the -- for "tie" after "input receives".
Line 15, substitute -- an input -- for "a input".
Line 22, substitute -- stream -- for "steam" after "pulse".
Line 33, insert -- a -- before "voltage controlled oscillator".
Line 49, substitute -- the -- for "We" before "control input".

Column 7,
Line 6, insert -- a -- before "controllable oscillator".
Line 14, substitute -- the -- for "die" before "first period".
Line 16, substitute -- the -- for "die" before "modulus control signal".

Signed and Sealed this

Fifteenth Day of October, 2002

*Attest:*

*Attesting Officer*

JAMES E. ROGAN
*Director of the United States Patent and Trademark Office*